(12) United States Patent
Khalil

(10) Patent No.: US 8,606,641 B2
(45) Date of Patent: Dec. 10, 2013

(54) SECURE INSTANT MESSAGE-BASED SALES

(75) Inventor: Manah M Khalil, Irving, TX (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 568 days.

(21) Appl. No.: 12/813,280

(22) Filed: Jun. 10, 2010

(65) Prior Publication Data

US 2011/0307355 A1 Dec. 15, 2011

(51) Int. Cl.
*G06Q 30/00* (2012.01)

(52) U.S. Cl.
USPC .......................................... 705/26.1

(58) Field of Classification Search
USPC .......................................... 705/26.1
See application file for complete search history.

(56) References Cited

U.S. PATENT DOCUMENTS

2007/0219901 A1* 9/2007 Garbow et al. ................. 705/39

\* cited by examiner

*Primary Examiner* — Mila Airapetian

(57) ABSTRACT

A server device may conduct an electronic sales transaction with a user device using instant message (IM)-based protocols, where the electronic sales transaction may include both: form-based IM communications that permit a form-based user interface (UI) to be displayed, on the user device, via which information regarding a user, of the user device, is received in a manner that is not accessible to an agent associated with the server device, and text-based IM communications that permit text-based IMs, between the agent associated with the server device and the user of the user device, to be displayed on the user device. The server device may further receive, via the form-based UI, a form-based IM that includes an order for one or more products or services associated with the electronic sales transaction.

19 Claims, 10 Drawing Sheets

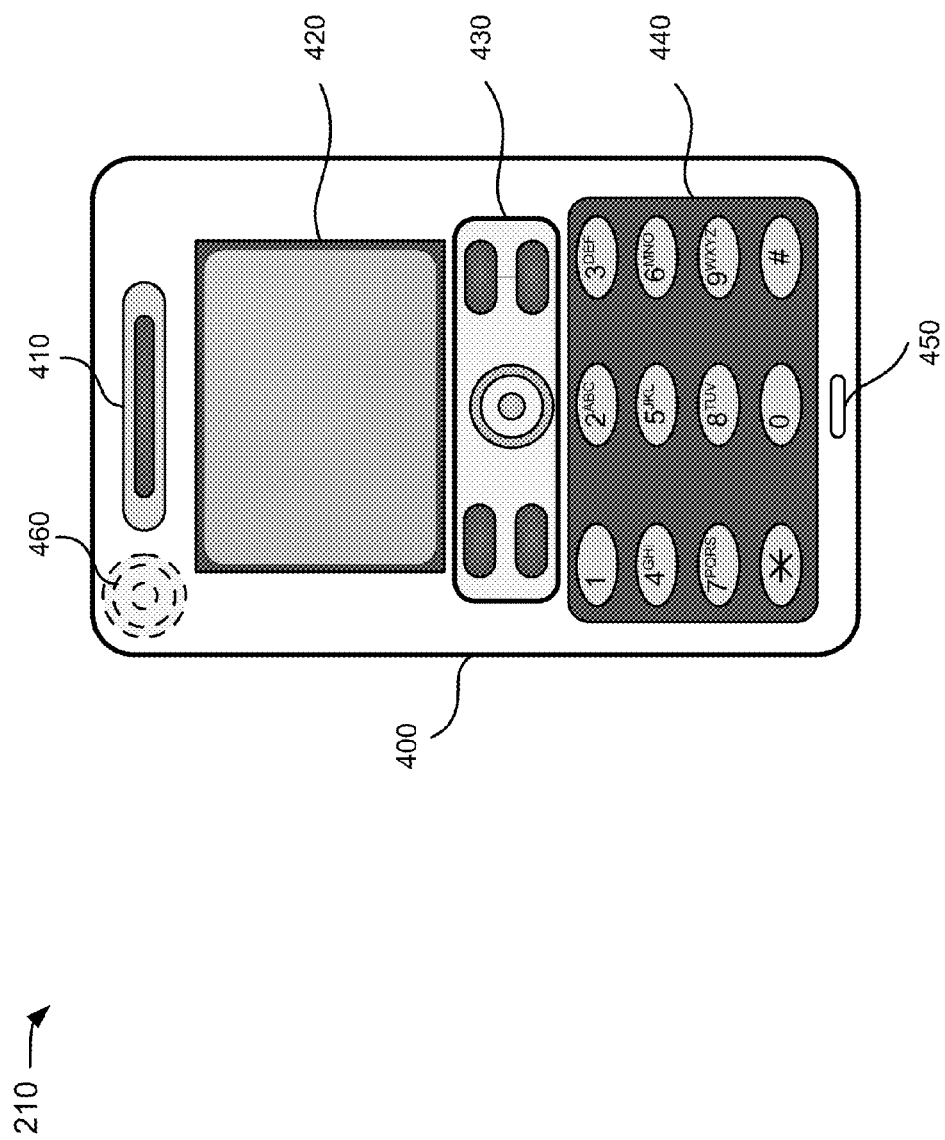

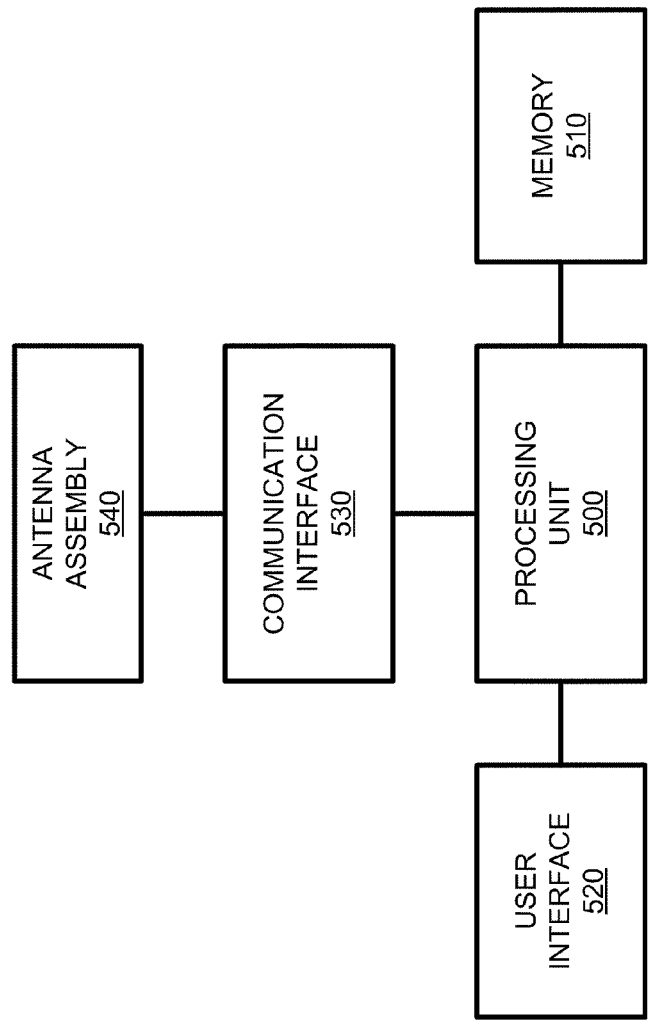

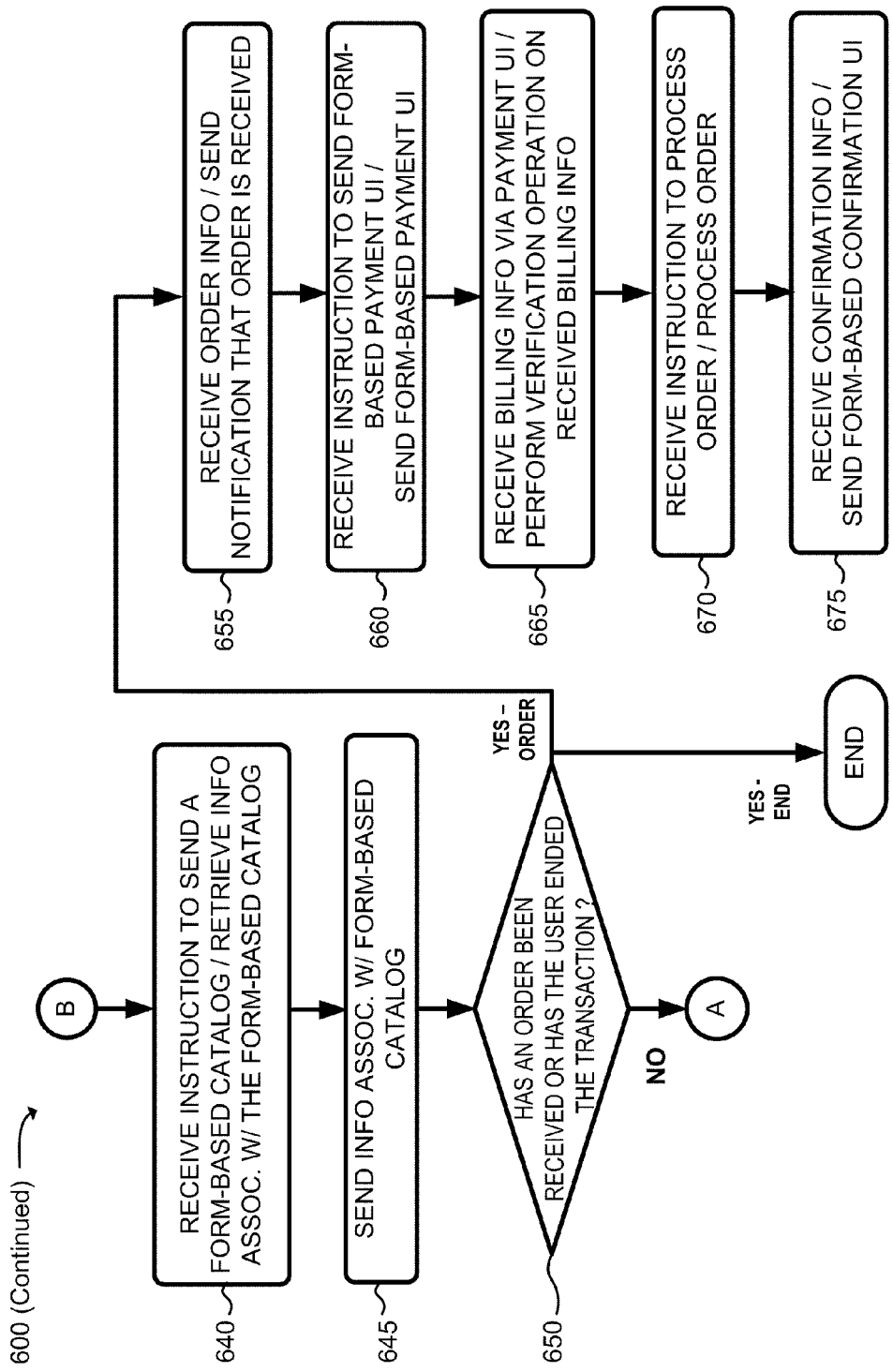

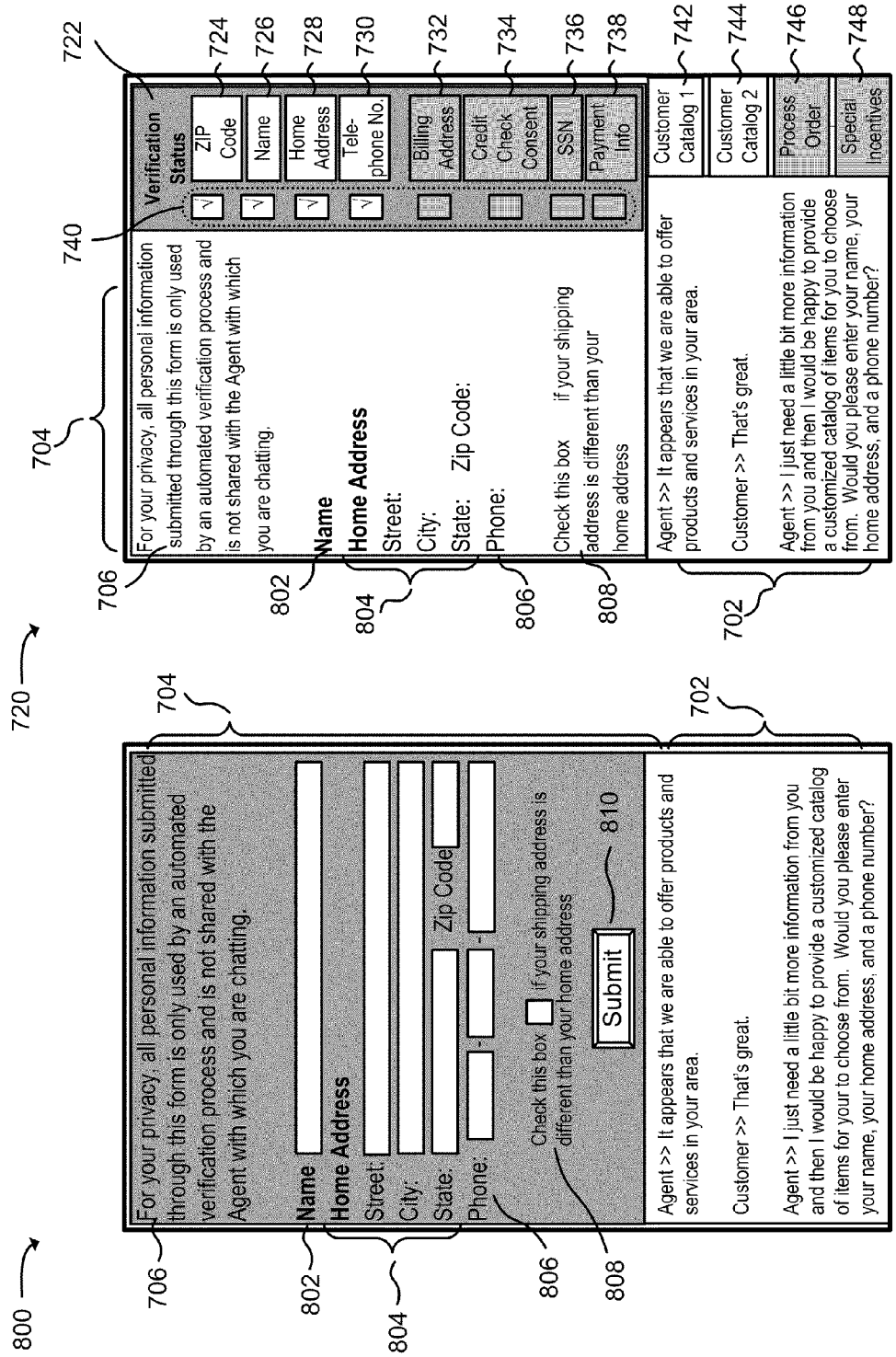

US 8,606,641 B2

SECURE INSTANT MESSAGE-BASED SALES

BACKGROUND

Electronic sales transactions have proliferated in recent years and now account for a significant portion of all sales transactions. Users, of user devices, may electronically purchase goods and services by accessing an electronic transaction system, such as a customer-facing website on the Internet, by placing a call to a call center to receive assistance from a customer service agent, by placing a call to a voice portal that receives voice or keypad commands via the user device, etc. Orders may be placed when the user selects the desired goods and services and electronically provides some form of user information (e.g., name, address, etc.) and/or some form of payment information. The electronic sales transaction system that receives the electronically provided information will use the electronically provided information to process the order and to provide the selected goods and services to the user.

BRIEF DESCRIPTION OF THE DRAWINGS

FIG. 4 is a diagram of an example user device of FIG. 2;

FIG. 5 is a diagram of example components of the user device of FIG. 4;

FIGS. 6A and 6B are a flowchart of an example process for performing a secure instant messaging-based sales transaction within an example portion of the network of FIG. 2;

FIGS. 7A, 8A, and 9A are examples of form-based user interfaces capable of being used by an example portion of the network of FIG. 2; and FIGS. 7B, 8B, and 9B are examples of versions of an agent user interface capable of being used by an example portion of the network of FIG. 2.

DETAILED DESCRIPTION OF PREFERRED EMBODIMENTS

The following detailed description refers to the accompanying drawings. The same reference numbers in different drawings may identify the same or similar elements. Also, the following detailed description does not limit the invention.

An implementation, described herein, may include systems and/or methods that provide secure instant message-based sales using instant message (IM) protocols that enable IM-based sales transactions concurrently using a combination of free form text messages, form-based IMs, and/or form-based user interfaces (UIs). More particularly, the secure IM-based sales implementation may use an IM-based sales transaction application (hereinafter referred to as an "IM application") to permit a user, of a user device, to communicate with a customer service agent (hereinafter referred to as "agent") to purchase goods and/or services. As described herein, the IM application may permit a user, of the user device, to send a text message to an agent and the IM application may automatically, or in response to instructions received from the agent, generate and/or present a form-based UI, using IM-based protocols, for display on the user device. The form-based UI may include structured and/or configured fields that permit the user to enter information to be submitted to the IM application using IM-based protocols (e.g., form-based IM) while concurrently permitting the user and the agent to communicate regarding the electronic sales transaction via IM-based protocols (e.g., text-based IM and/or text messaging). As further described herein, the IM application may receive, from the user device and via the form-based UI, an order for goods and/or services based on a form-based IM protocol that includes user information, billing information, payment information, and/or other information. As yet further described herein, the IM application may perform operations to verify user information, billing information, payment information, and/or other information and may process the verified information to enable the electronic sale of the goods and/or services in a manner that does not expose all or a portion of the received and/or verified information to the agent.

Figure 1:
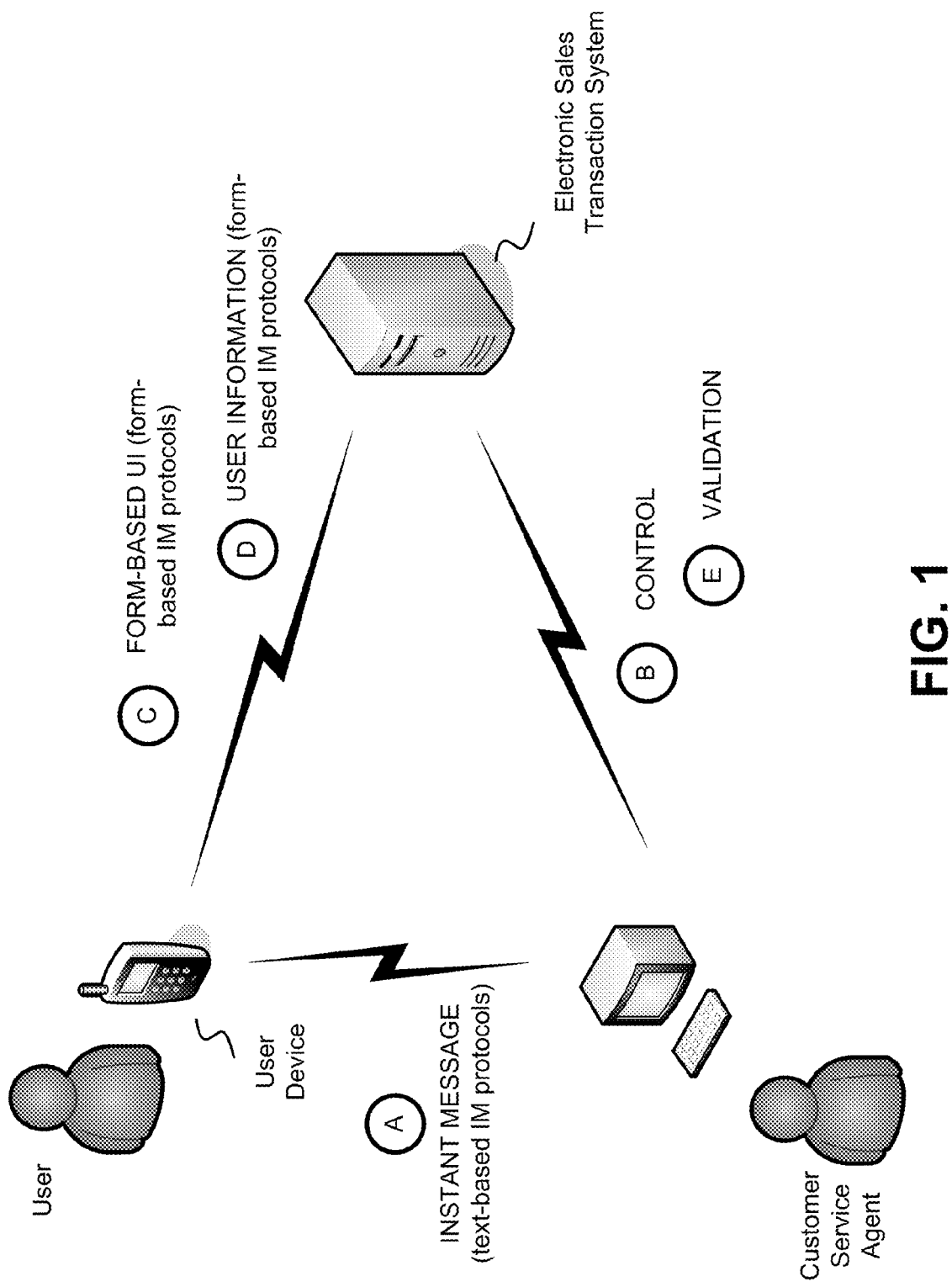
FIG. 1 is a diagram that illustrates an overview of a secure instant message-based sales implementation described herein.

FIG. 1 is a diagram that illustrates an overview of a secure IM-based sales implementation described herein. As illustrated in FIG. 1, a user may use a user device to communicate (e.g., shown as "Instant Message" indication A) with a customer service agent via IM (e.g., via a chat session using free form text, via text messaging, and/or via other forms of IM) to inquire about purchasing particular goods and/or services. The agent may receive the IM and may send an IM response back to the user device acknowledging receipt of the user's IM and/or requesting that the user provide certain information via a form-based UI that is to be displayed on the user device. Additionally, or alternatively, in response to the received IM, the agent may send an instruction (e.g., shown as "Control" indication B) to an electronic sales transaction system (hereinafter referred to as a "system") to present a user information form-based UI to the user device for display.

An operation to generate a particular form-based UI for presentation to the user device may be performed. For example, the system may receive the instruction and may use the IM application to perform an operation to generate information associated with a form-based user information UI in response to the received instruction. The IM application may present, using a form-based IM protocol, the information associated with the form-based user information UI to the user device for display (e.g., shown as "Form-based UI" indication C). Additionally, or alternatively, the IM application may present other information associated with the form-based user information UI for display on a display associated with the agent to notify the agent that the form-based user information UI was presented for display on the user device.

An operation to validate the received user information may be performed. For example, the system may receive, via the form-based user information UI and using IM-based protocols, information from the user device (e.g., shown as "User Information" indication D), that may include information associated with the user device (e.g., a device identifier, such as a mobile device number (MDN), an IP address, etc.) and/or information associated with a user of the user device (e.g., zip code information, a name associated with the user, a home address, a telephone number, etc.). It should be understood that information received from the user device, via the form-based user information UI, may be handled by the IM application in a manner that does not expose the user information to the agent. For example, the IM application may perform an operation to validate the user information by comparing the received user information with user information stored in a memory associated with the system. If the received user information matches the user information stored in the memory, the IM application may send a validation notification to the agent (e.g., shown as "validation" indication E) indicating that the received user information was validated by the IM application. The agent may receive the validation notification and may use the validation notification to determine a customized variety of goods and/or services to offer to the user. Based on the determination, the agent may send another instruction to the system to send a customized form-based catalog UI that contains information associated with a customized variety of goods and/or services based on the validated user information and/or that corresponds to the subject matter of the IM exchange between the agent and the user device (e.g., indication A). If, however, the IM application cannot validate the received user information, the agent may send yet another instruction to the system to send a generic catalog UI that contains generic information and/or advertising associated with the goods and/or services.

An operation to generate a customized form-based catalog UI for presentation to the user device may be performed. For example, the system may receive the other instruction from the agent and the IM application may perform an operation to generate information associated with the customized form-based catalog UI in response to the other instruction. The IM application may present, using form-based IM protocols, the information associated with the customized form-based catalog UI to the user device for display (e.g., shown as indication C). Additionally, or alternatively, the IM application may present other information, associated with the customized form-based catalog UI, for display on a display associated with the agent to notify the agent that the particular form-based catalog UI was presented for display on the user device.

An operation to complete the sale may be performed. For example, the agent may receive an IM from the user indicating that the user desires to purchase particular goods and/or services associated with the customized form-based catalog UI and, in a manner similar to that described above (e.g., with respect to indication B), the agent may send an instruction to the system indicating that a form-based payment UI to obtain payment information should be sent to the user device. The system may receive the instruction and in a manner similar to that described above (e.g., with respect to indication C), may present the form-based payment UI to obtain payment information, for goods and/or services selected by the user. The system may receive the payment information in a manner that does not expose the payment information to the agent and may perform an operation to validate the payment information by comparing the received payment information with payment information stored in a memory. Based on a determination that the payment information is valid, the IM application may generate confirmation information and may send, using form-based IM protocols, the confirmation information to the user device as a form-based UI that includes the confirmation information. Additionally, or alternatively, the IM application may send a notification to the agent that the payment information was validated and/or information indicating that the sale was confirmed.

Figure 2:
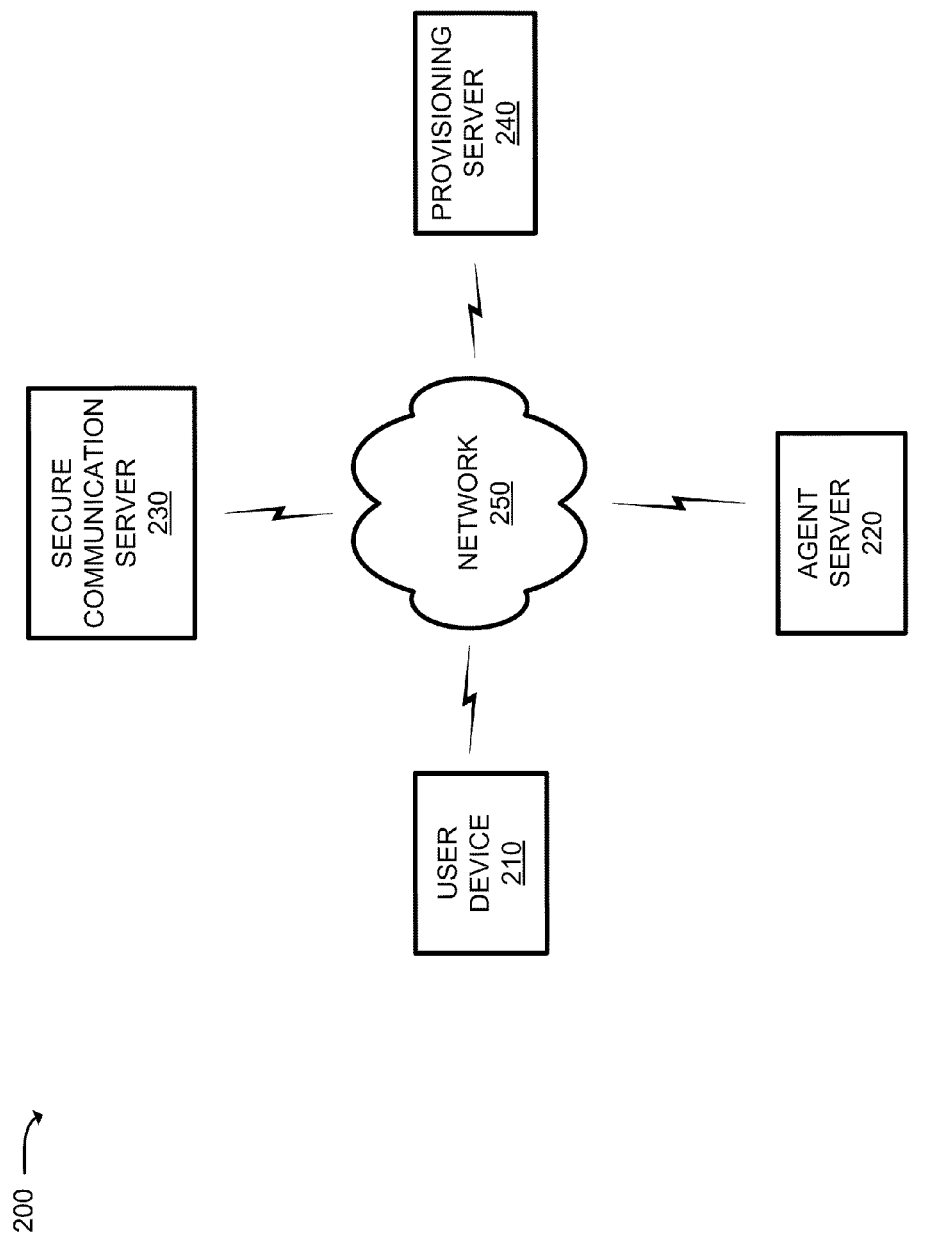
FIG. 2 is a diagram of an example network in which systems and/or methods described herein may be implemented.

FIG. 2 is a diagram of an example network 200 in which systems and/or methods described herein may be implemented. As shown in FIG. 2, network 200 may include a user device 210, an agent server 220, a secure communication server 230 (hereinafter referred to as "communication server 230"), a provisioning server 240, and a network 250. The number of devices, illustrated in FIG. 2, is provided for explanatory purposes only. In practice, there may be additional devices, fewer devices, different devices, or differently arranged devices than illustrated in FIG. 2.

Also, in some implementations, one or more of the devices of network 200 may perform one or more functions described as being performed by another one or more of the devices of network 200. For example, agent server 220, communication server 230, and/or provisioning server 240 may be integrated into a single device. Devices of network 200 may interconnect via wired connections, wireless connections, or a combination of wired and wireless connections.

User device 210 may include any computation or communication device, such as a wireless mobile communication device that is capable of communicating via network 250. For example, user device 210 may include a radiotelephone, a personal communications system (PCS) terminal (e.g., that may combine a cellular radiotelephone with data processing and data communications capabilities), a personal digital assistant (PDA) (e.g., that can include a radiotelephone, a pager, Internet/intranet access, etc.), a laptop computer, a personal computer, a landline telephone, a set top box (STB), a television, a camera, a personal gaming system, or another type of computation or communication device.

User device 210 may be associated with unique user device identification information that enables agent server 220, communication server 230, and/or provisioning server 240 to distinguish user device 210 from other user devices 210. The user device identification information may include, for example, a private identifier (e.g., an international mobile subscriber identity (IMSI), a national access identifier (NAI), etc.), a public identifier (e.g., a mobile device number (MDN), landline device number (LDN), mobile subscriber integrated services digital network (MSISDN), etc.), an Internet protocol (IP) address, etc. User device 210 may communicate with agent server 220 via IM protocols, such as session initiation protocol (SIP), SIP for instant messaging and presence leveraging extensions (SIMPLE), America Online IM protocol (AIM), Yahoo! Messenger, Windows Live messenger, and/or other instant messaging protocols. Other communication protocols may be used by user device 210, such as short messaging protocols (e.g., SMS), IP protocols (e.g., TCP/IP, IPv4, IPv6, etc.), and/or other protocols.

The description to follow will generally refer to user device 210 as a wireless mobile communication device that communicates primarily using instant messaging protocols. The description is not limited, however, to a wireless mobile communication device and may equally apply to other types of user devices that use other types of protocols.

Agent server 220 may include one or more server devices, or other types of computation or communication devices, that gather, process, search, store, and/or provide information in a manner similar to that described herein. For example, agent server 220 may permit an agent to communicate with user device 210 using text-based IM protocols. Additionally, or alternatively, agent server 220 may communicate with communication server 230 using IM-based protocols, IP protocols, and/or other protocols. For example, agent server 220 may communicate, using IM-based protocols, with user device 210 via free form text (e.g., by exchanging IMs in an IM chat session, etc.) to provide products and/or services for a user of user device 210. Additionally, or alternatively, agent server 220 may send instructions to communication server 230, associated with the IM-based communication with user device 210, using IM-based protocols, IP protocols, and/or other protocols.

Communication server 230 may include one or more server devices, or other types of computation or communication devices, that gather, process, search, store, and/or provide information in a manner similar to that described herein. For example, communication server 230 may include a server device that hosts an IM application that permits communication server 230 to perform operations associated with secure IM-based sales. Communication server 230 may receive instructions from agent server 220 to generate a particular form-based UI and to send the particular form-based UI to user device 210 using an IM-based protocol. Communication server 230 may receive information from user device 210, via the particular form-based UI and using IM-based protocols, and may communicate with provisioning server 240 to perform operations to authenticate user device 210 and/or verify information associated with the user of user device 210, such as payment information (e.g., credit card information, shipping address, etc.), user information (e.g., name, address, zip code, etc.), and/or other information. In another example, communication server 230 may communicate with provisioning server 240 to perform a credit check and/or perform other operations associated with the user of user devices 210. Communication server 230 may send a notification to agent server 220 indicating whether user device 210 is authenticated, whether received information is validated, and/or whether an operation to determine the creditworthiness of the user of user device 210 has been performed. In one implementation, received user information and/or information obtained as a result of an operation, such as, for example, to obtain a measure of creditworthiness (e.g., a credit score) associated with the user, may be handled by communication server 230 in a manner in which the user information and/or information obtained as a result of an operation is not exposed to and/or accessible by an agent associated with agent server 220.

Provisioning server 240 may include one or more server devices, or other types of computation or communication devices, that gather, process, search, store, and/or provide information in a manner similar to that described herein. For example, provisioning server 240 may include a server device that performs operations to determine whether information, received from communication server 230, is valid, to perform credit check operations, to perform operations to process payment information and/or to perform other operations. In one example, provisioning server 240 may receive, from communication server 230, information associated with the user device 210 (e.g., an MDN, IP address, etc.) and may perform an operation to authenticate user device 210. In another example, provisioning server 240 may receive, from communication server 230, information associated with a user of user device 210 (e.g., name, password, personal identification number (PIN), address information, etc.) and may perform an operation validate the information. In yet another example, provisioning server 240 may receive, from communication server 230, payment information (e.g., credit card information, billing address, etc.) associated with a user's selected goods and/or services and may perform an operation to validate the payment information. In still another example, provisioning server 240 may receive, from communication server 230, an instruction to perform a credit check on a user associated with user device 210 and may use information, associated with the user and obtained from the instruction (e.g., a name, social security number (SSN), etc.), to perform an operation to determine the creditworthiness of the user by obtaining a measure of creditworthiness (e.g., a credit rating) associated with the user.

Network 250 may include one or more wired and/or wireless networks. For example, network 250 may include a cellular network, the Public Land Mobile Network (PLMN), and/or a 2G, a 3G, and/or a 4G network. Additionally, or alternatively, network 250 may include a wide area network (WAN), a metropolitan area network (MAN), a telephone network (e.g., the Public switched telephone Network (PSTN)), an ad hoc network, an intranet, the Internet, a fiber optic-based network (e.g., a fiber optic service (FiOS) network), and/or a combination of these or other types of networks.

Figure 3:
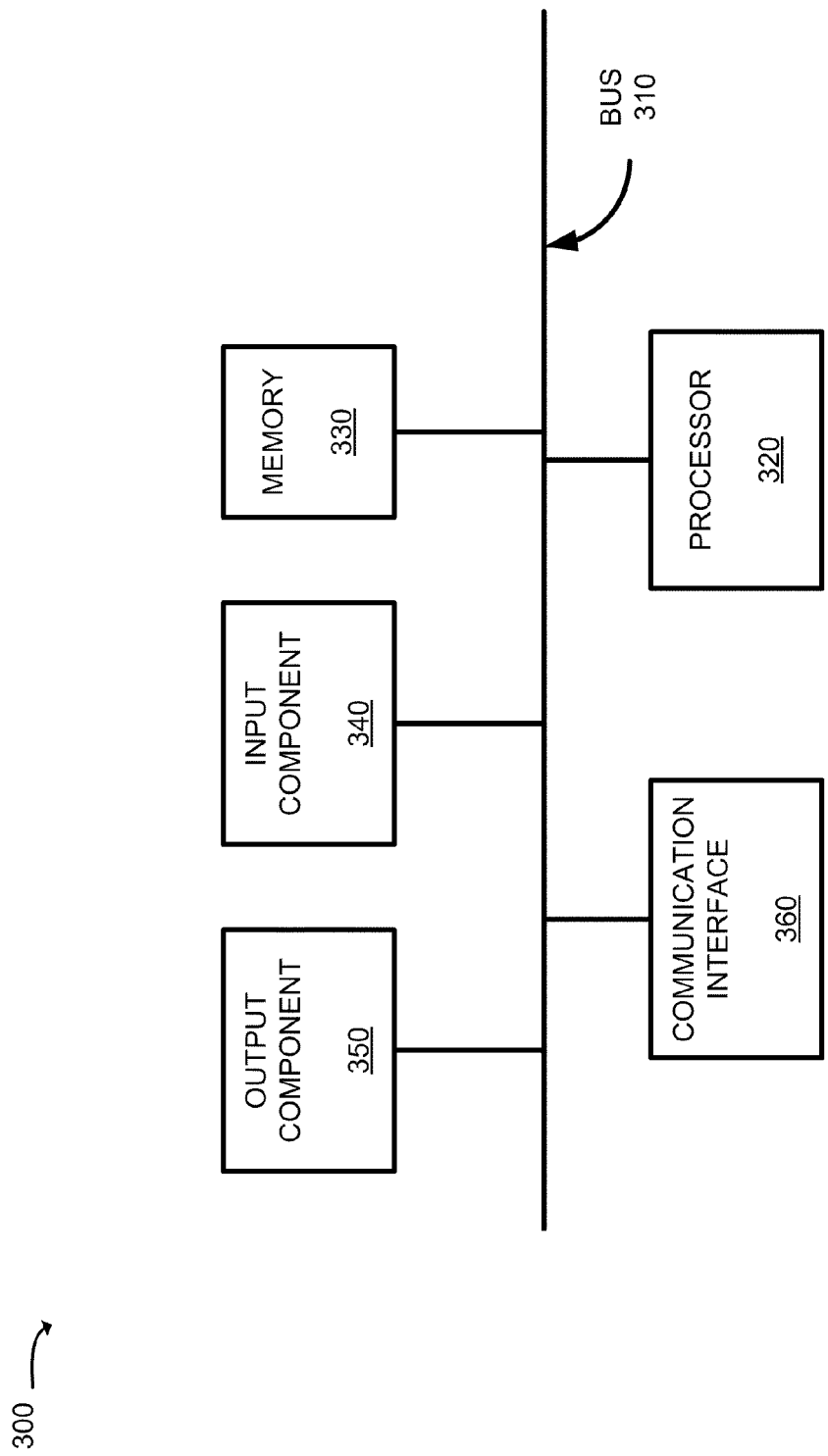
FIG. 3 is a diagram of example components of one or more of the devices of FIG. 2.

FIG. 3 is a diagram of example components of a device 300. Device 300 may correspond to agent server 220, communication server 230, and/or provisioning server 240. Device 300 may include a bus 310, a processor 320, a memory 330, an input component 340, an output component 350, and a communication interface 360. Although FIG. 3 shows example components of device 300, in other implementations, device 300 may contain fewer components, additional components, different components, or differently arranged components than depicted in FIG. 3. Additionally, or alternatively, one or more components of device 300 may perform one or more tasks described as being performed by one or more other components of device 300.

Bus 310 may include a path that permits communication among the components of device 300. Processor 320 may include a processor, microprocessor, or processing logic that may interpret and execute instructions. Memory 330 may include any type of dynamic storage device that may store information and instructions, for execution or use by processor 320, and/or any type of non-volatile storage device that may store information for use by processor 320.

Input component 340 may include a mechanism that permits a user to input information to device 300, such as a keyboard, a keypad, a button, a switch, etc. Output component 350 may include a mechanism that outputs information to the user, such as a display, a speaker, one or more light emitting diodes (LEDs), etc. Communication interface 360 may include any transceiver-like mechanism that enables device 300 to communicate with other devices and/or systems via wireless communications (e.g., radio frequency, infrared, and/or visual optics, etc.), wired communications (e.g., conductive wire, twisted pair cable, coaxial cable, transmission line, fiber optic cable, and/or waveguide, etc.), or a combination of wireless and wired communications. For example, communication interface 360 may include mechanisms for communicating with another device or system via a network, such as network 250.

As will be described in detail below, device 300 may perform certain operations relating to secure IM-based sales. Device 300 may perform these operations in response to processor 320 executing software instructions contained in a computer-readable medium, such as memory 330. A computer-readable medium may be defined as a physical or logical memory device. A logical memory device may include memory space within a single physical memory device or spread across multiple physical memory devices. The software instructions may be read into memory 330 from another computer-readable medium or from another device. The software instructions contained in memory 330 may cause processor 320 to perform processes described herein. Alternatively, hardwired circuitry may be used in place of or in combination with software instructions to implement processes described herein. Thus, implementations described herein are not limited to any specific combination of hardware circuitry and software.

FIG. 4 is a diagram of an example user device 210. As shown in FIG. 4, user device 210 may include a housing 400, a speaker 410, a display 420, control buttons 430, a keypad 440, a microphone 450, and/or a camera 460. Housing 400 may include a chassis on which some or all of the components of user device 210 are mechanically secured and/or covered. Although FIG. 4 depicts exemplary components of user device 210, in other implementations, user device 210 may contain fewer components, additional components, different components, or differently arranged components than illustrated in FIG. 4. Additionally, or alternatively, one or more components of user device 210 may perform one or more tasks described as being performed by one or more other components of user device 210.

Speaker 410 may include a component to receive input electrical signals from user device 210 and transmit audio output signals, which communicate audible information to a user of user device 210. Display 420 may include a component to receive input electrical signals and present a visual output in the form of text, images, videos, and/or combinations of text, images, and/or videos which communicate visual information to the user of user device 210. In one implementation, display 420 may display text input into user device 210, text, images, and/or video received from another device, and/or information regarding incoming or outgoing calls or text messages, emails, media, games, phone books, address books, the current time, etc.

Control buttons 430 may include one or more buttons that accept, as input, mechanical pressure from the user (e.g., the user presses a control button or combinations of control buttons) and may send electrical signals to processing unit 320 that may cause user device 210 to perform one or more operations. For example, control buttons 430 may be used to cause user device 210 to transmit information. Keypad 440 may include a standard telephone keypad or another arrangement of keys.

Microphone 450 may include a component to receive audible information from the user and send, as output, an electrical signal that may be stored by user device 210, transmitted to another user device, or cause user device 210 to perform one or more operations. Camera 460 may be provided on a back side of user device 210, and may include a component to receive, as input, analog optical signals and send, as output, a digital image or video that can be, for example, viewed on the display 410, stored in the memory of user device 210, discarded and/or transmitted to another user device 210.

FIG. 5 is a diagram of example components of user device 210. As shown in FIG. 5, user device 210 may include a processing unit 500, a memory 510, a user interface 520, a communication interface 530, and/or an antenna assembly 540. Although FIG. 5 shows example components of user device 210, in other implementations, user device 210 may contain fewer components, additional components, different components, or differently arranged components than depicted in FIG. 5. Additionally, or alternatively, one or more components of user device 210 may perform one or more tasks described as being performed by one or more other components of user device 210.

Processing unit 500 may include a processor, a microprocessor, an ASIC, a FPGA, or the like. Processing unit 500 may control operation of user device 210 and its components. In one implementation, processing unit 500 may control operation of components of user device 210 in a manner similar to that described herein. Memory 510 may include a random access memory (RAM), a read only memory (ROM), and/or another type of memory to store data and/or instructions that may be used by processing unit 500.

User interface 520 may include mechanisms for inputting information to user device 210 and/or for outputting information from user device 210. Examples of input and output mechanisms might include buttons (e.g., control buttons 430, keys of keypad 440 or a keyboard, a joystick, etc.); a touch screen interface to permit data and control commands to be input into user device 210; a speaker (e.g., speaker 410) to receive electrical signals and output audio signals; a microphone (e.g., microphone 450) to receive audio signals and output electrical signals; a display (e.g., display 420) to output visual information (e.g., form-based UIs, free form text, etc.); a vibrator to cause user device 210 to vibrate; and/or a camera (e.g., camera 460) to receive video and/or images.

Communication interface 530 may include, for example, a transmitter that may convert baseband signals from processing unit 500 to radio frequency (RF) signals and/or a receiver that may convert RF signals to baseband signals. Alternatively, communication interface 530 may include a transceiver to perform functions of both a transmitter and a receiver of wireless communications (e.g., radio frequency, infrared, visual optics, etc.), wired communications (e.g., conductive wire, twisted pair cable, coaxial cable, transmission line, fiber optic cable, waveguide, etc.), or a combination of wireless and wired communications. Communication interface 530 may connect to antenna assembly 540 for transmission and/or reception of the RF signals.

Antenna assembly 540 may include one or more antennas to transmit and/or receive RF signals over the air. Antenna assembly 540 may, for example, receive RF signals from communication interface 530 and transmit them over the air, and receive RF signals over the air and provide them to communication interface 530. In one implementation, for example, communication interface 530 may communicate with a network and/or devices connected to a network (e.g., network 250).

As described in detail below, user device 210 may perform certain operations described herein in response to processing unit 500 executing software instructions of an application contained in a computer-readable medium, such as memory 510. The software instructions may be read into memory 510 from another computer-readable medium or from another device via communication interface 530. The software instructions contained in memory 510 may cause processing unit 500 to perform processes that will be described later. Alternatively, hardwired circuitry may be used in place of or in combination with software instructions to implement processes described herein. Thus, implementations described herein are not limited to any specific combination of hardware circuitry and software.

Figure 6A:
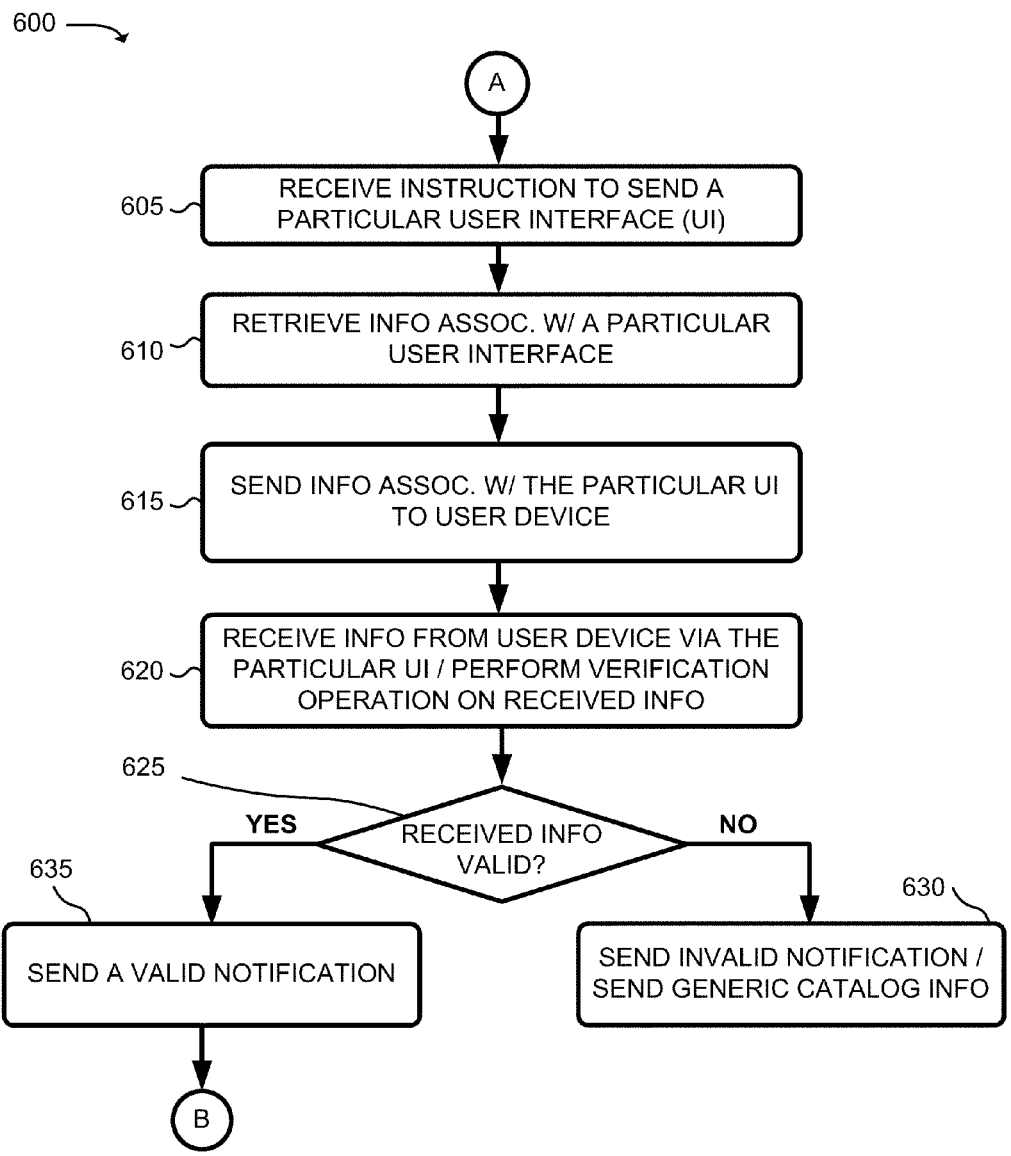

FIGS. 6A and 6B are a flowchart of an example process 600 for performing a secure IM-based sales transaction within an example portion of network 200 (FIG. 2). In one implementation, process 600 may be performed by communication server 230. In another implementation, some or all of process 600 may be performed by a device or collection of devices separate from, or in combination with, communication server 230. FIGS. 7A-9B are example user interfaces capable of being used by an example portion of network 200 (FIG. 2). A portion of process 600, of FIGS. 6A and 6B, will be discussed below with corresponding references to the user interfaces shown in FIGS. 7A-9B.

Process 600, of FIG. 6A, may include receiving an instruction to send a particular form-based user interface (block 605). For example, a user of user device 210 may desire to communicate with a business, such as a merchant, a web-based entity, etc., to learn about and/or purchase products and/or services offered by the business. User device 210 may send a free form text message, using an IM-based protocol (herein after referred to as an IM), to communicate with an agent associated with agent server 220. Agent server 220 may receive the IM and may automatically send an instruction to communication server 230 to send a form-based welcome UI to user device 210. In another implementation, agent server 220 may receive the IM from user device 210, may present the IM on a display associated with an agent, and the agent may send the instruction to communication server 230. In yet another implementation, the agent may be associated with communication server 230 and communication server 230 may receive the IM from user device 210. In one example, communication server 230 may present the IM on a display associated with the agent and the agent may instruct communication server 230 to send a form-based welcome UI to user device 210. As described herein, although the agent will be described as being associated with agent server 220, in other implementations, the agent may be associated with communication server 230.

Figures 7A, 7B:
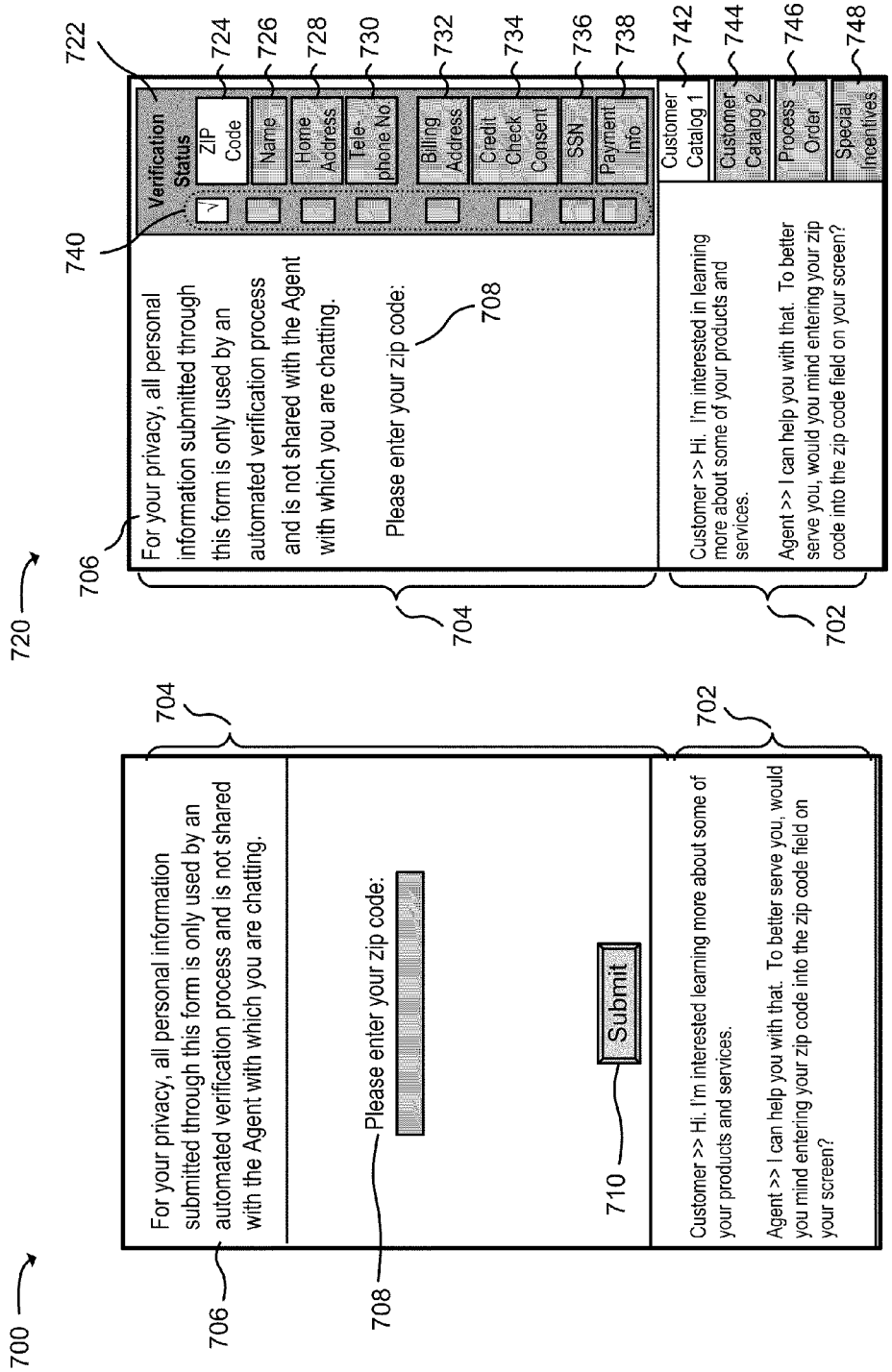

Process 600 may also include retrieving information associated with a particular UI (block 610). For example, communication server 230 may receive the instruction from agent server 220 and may retrieve, from a memory associated with communication server 230, information associated with the form-based welcome UI, such as form-based welcome UI 700 of FIG. 7A. Form-based welcome UI 700 may include a free form text field 702, form-based field 704, user privacy legend 706, zip code entry field 708, and/or submit button field 710. While FIG. 7A illustrates form-based welcome UI 700, that includes certain fields, such as fields 702-710, in another implementation, a form-based welcome UI 700 may include fewer fields, additional fields, different fields or differently arranged fields than are described with respect to FIG. 7A.

Free form text field 702 (hereinafter referred to as "text field 702") may include text information associated with a chat session, using IM-based protocols, between a user of user device 210 and an agent associated with agent server 220. For example, text field 702 may include free form text information received from user device 210 (e.g., Customer>> "Hi. I'm interested in learning more about some of your products and services") and/or free form text information sent by an agent associated with agent server 220 (e.g., Agent>> "I can help you with that"). Form-based field 704 may include other fields (e.g., 706, 708, etc.), buttons (e.g., 710), and/or other fields, buttons, or data items that are configured and/or laid out in structured format, such as a form-based format. Privacy legend field 706 may include a statement indicating to a user of user device 210 that all or a portion of the information provided by the user, such as user information (e.g., name, password, PIN, payment information, SSN, etc.), payment information (e.g., credit card information, billing address information, etc.), etc. will not be shared with an agent with which the user is communicating. Zip code entry field 708 permits the user to enter a zip code that may be used by communication server 230. Submit button field 710 may permit a user to submit information, entered into the form-based field 704, when submit button field 710 is selected by the user (e.g., by pressing a particular button on a key pad associated with user device 210 and/or by selecting submit button 710 via a touch screen associated with user device 210).

Process 600 may further include sending information associated with the particular UI (block 615). For example, communication server 230 may send, using an IM-based protocol, the retrieved information associated with form-based welcome UI 700 (e.g., fields 702-710) to user device 210 for display. Additionally, or alternatively, communication server 230 may send a notification, to agent server 220, for display on a display associated with the agent. The notification may include information associated with an agent UI that includes some or all of the fields associated with the form-based welcome UI (e.g., form-based welcome UI 700 of FIG. 7A), such as agent UI 720 of FIG. 7B. For example, agent UI 720 may include all or a portion of the fields (e.g., fields 702-710) included in form-based welcome UI 700 (FIG. 7A) and/or may include verification status field 722, zip code field 724, name field 726, home address field 728, telephone number field 730, billing information (info) field 732, credit check consent field 734, social security number (SSN) field 736, payment information field 738, verification status field 740, first customer catalog field 742 (e.g., shown as customer catalog 1), second customer catalog field 744 (e.g., shown as customer catalog 2), process order field 746, and/or special incentives field 748. While FIG. 7B illustrates agent UI 720, that includes certain fields, such as fields 702-710 and/or 722-748, in another implementation, an agent UI 720 may include fewer fields, additional fields, different fields or differently arranged fields than are described with respect to FIG. 7B.

Verification status field 722 may include a set of fields (e.g., fields 724-738), each described below, that collectively indicate the degree to which information, received from user device 210 through the course of the chat session, have been received by the IM application. Zip code field 724 may be an indicator regarding whether a zip code has been received from user device 210. For example, if the IM application determines that a zip code has been received from user device 210, then the IM application may send a notification to agent server 220 that may cause an indication to be displayed indicating that the zip code has been received (e.g., by changing the visual appearance of zip code field 724). Name field 726 may be an indicator regarding whether a name, associated with the user of user device 210, has been received from user device 210. For example, if the IM application determines that a name has been received from user device 210, then the IM application may send a notification to agent server 220 may cause an indication to be displayed that indicates that the name has been received (e.g., by changing the physical appearance of name field 726). Additionally, or alternatively, name field 726 may permit an agent to send an instruction to communication server 230 to send all or a portion of a form-based user information UI to user device 210 when the agent selects name field 726 in a manner described above.

Home address field 728 may be an indicator regarding whether a home address has been received from user device 210 (e.g., if the IM application changes the physical appearance of the field as described above). Additionally, or alternatively, home address field 728 may permit an agent to send an instruction to communication server 230 to send all or a portion of the form-based user information UI to user device 210 in the manner described above. Telephone number field 730, may be an indicator regarding whether a telephone number has been received from user device 210 (e.g., if the IM application changes the physical appearance of the field as described above). Additionally, or alternatively, telephone number field 728 may permit an agent to send an instruction to communication server 230 to send all or a portion of the form-based user information UI to user device 210 in the manner described above. Billing address field 732, may be an indicator regarding whether a billing address has been received from user device 210 (e.g., if the IM application changes the physical appearance of the field as described above). Additionally, or alternatively, billing address field 732 may permit an agent to send an instruction to communication server 230 to send all or a portion of a form-based payment UI to user device 210 in the manner described above.

Credit check consent field 734, may be an indicator regarding whether informed consent to perform a credit check on the user of user device 210, as described in detail below, has been received from user device 210 (e.g., if the IM application changes the physical appearance of the field as described above). Additionally, or alternatively, credit check consent field 734 may permit an agent to send an instruction to communication server 230 to send all or a portion of the payment UI to user device 210 in the manner described above. SSN field 736 may be an indicator regarding whether a SSN, associated with the user of user device 210, has been received from user device 210 (e.g., if the IM application changes the physical appearance of the field as described above). Additionally, or alternatively, SSN field 736 may permit an agent to send an instruction to communication server 230 to send all or a portion of the payment UI to user device 210 in the manner described above. Payment information field 738 may be an indicator regarding whether payment information (e.g., a credit card number, expiration date, check number, bank routing number, etc.) has been received from user device 210 (e.g., if the IM application changes the physical appearance of the field as described above). Additionally, or alternatively, payment information field 738 may permit an agent to send an instruction to communication server 230 to send all or a portion of the payment UI to user device 210 in the manner described above.

Verification status field 740 may be an indicator regarding whether the zip code, received from user device 210, has been verified. For example, if the IM application and/or provisioning server 240 determine that the zip code is valid, then the IM application may insert a particular mark (e.g., a check mark "✓" and/or another particular mark) in verification status field 740 corresponding to zip code field 724. If, however, the IM application and/or provisioning server 240 determines that the zip code is not valid, then the IM application may insert another mark (e.g., an "X" and/or some other mark) in verification status field 740. Customer catalog 1 field 742 may permit an agent to instruct communication server 230 to send particular information to user device 210 if the IM application determines that the zip code, received from user device 210 is valid. The particular information may include products and/or services, advertisement information, promotional materials, etc. that are available and/or offered at, or within a particular distance of, an area associated with the zip code received from user device 210. Customer catalog 2 field 744 may permit an agent to send an instruction to communication server 230 to send particular information (e.g., details, terms and/or conditions associated products and/or services that are available at the location corresponding to the address information provided by the user, potential installation dates and/or times, details associated with special offers, incentives, etc.) to user device 210 if the IM application and/or provisioning server 240 determines that the user information, received from user device 210 is valid. Process order field 746 may permit an agent, associated with agent server 220, to send an instruction to communication server 230 to process an order when billing information is determined to be valid by the IM application and/or provisioning server 240. Special incentives field 926 may permit the agent to send an instruction to communication server 230 to present a form-based special incentives UI to user device 210 when the creditworthiness, corresponding to a user associated with a billing name received from user device 210, is greater than a particular threshold. For example, a user that is determined to have a high credit rating (e.g., greater than a particular threshold), may be offered more incentives, flexible payment plans, and/or special offers as compared to a user that is determined to have a low credit rating (e.g., less than or equal to the particular threshold and/or some other threshold).

Returning to FIG. 6A, the agent server 220 may receive the notification from communication server 230 and may display information associated with an agent UI (e.g., agent UI 720 of FIG. 7B) and/or the IM received from user device 210 on a display associated with the agent. The agent may view the agent UI and may respond to the user by sending an IM to user device 210 instructing the user to enter particular information into the form-based welcome UI displayed on user device 210 (e.g., Agent>> "I can help you with that. To better serve you, would you mind entering your zip code into the zip code field on your screen?").

Process 600 may include receiving information from a user device via a particular UI and performing a verification operation on the received information (block 620). For example, user device 210 may receive the IM from agent server 210 and may display the IM in text field 702 of form-based welcome UI 700 (7A) displayed by user device 210. The user may respond to the received IM by entering a zip code (e.g., using the key pad on user device 210) into zip code entry field 708 and may send the zip code to communication server 230, using an IM protocol, by selecting the submit button field 710 associated with form-based welcome UI 700 (e.g., by pressing a particular button or set of buttons on user device 210). Communication server 230 may receive the zip code information and may send a notification to agent server 220 that may cause zip code field 724 to indicate (e.g., by changing physical appearance) that zip code information has been received from user device 210.

A verification operation may be performed. For example, communication server 230 may receive the zip code information and the IM application may send the received zip code information to provision server 240 to perform a verification operation on the zip code information to determine whether the received zip code information is valid. Provisioning server 240 may, for example, compare the received zip code information with zip code information stored in a memory, associated with communication server 230, to determine whether the received zip code information matches the stored zip code information. Provisioning server 240 may send the results of the verification operation to communication server 230.

If the received information is not valid (block 625—NO), then an invalid notification may be sent and a generic catalog may be sent (block 630). For example, if the IM application determines that the received zip code information does not match the stored zip code information, then the IM application may direct communication server 230 to present an invalid notification to agent server 220 for display notifying the agent that the zip code is not valid. The notification may cause a particular mark (e.g., an "X"—not shown in FIG. 7B) to be placed in verification status field 740 (FIG. 7B), corresponding to zip code field 724, indicating that the zip code could not be verified. The agent may, in response to the notification, optionally send an IM to user device 210 requesting that the user reenter the zip code.

Additionally, or alternatively, the IM application may automatically retrieve, from a memory associated with communication server 230, information associated with a form-based generic catalog and may direct communication server 230 to present the information associated with the generic catalog, using IM-based protocols, to user device 210 for display. The generic catalog may contain general information associated with products and/or services, advertising information, promotional materials, etc. In another implementation, the IM application may receive an instruction from agent server 220, in response to the invalid notification, to present the information, associated with the form-based generic catalog, to user device 210.

If the received information is valid (block 625—YES), then a valid notification may be sent (block 635). For example, if the IM application determines that the received zip code information matches the stored zip code information, then the IM application may direct communication server 230 to present a valid notification, to agent server 220 for display, notifying the agent that the zip code is valid. The notification may cause a particular mark (e.g., a "✓") to be placed in verification status field 740 (FIG. 7B), corresponding to zip code field 724, indicating that the zip code was verified.

Process 600, of FIG. 6B, may include receiving an instruction to send a form-based catalog and retrieving information associated with the form-based catalog (block 640). The agent may receive the valid notification and may cause agent server 220 to send an instruction to communication server 230 to send a particular catalog (e.g., a first customer catalog) to user device 210 by selecting customer catalog 1 field 742 (e.g., by pressing a particular button or series of buttons on user device 210). Communication server 230 may receive the instruction and the IM application may retrieve information associated with a form-based first customer catalog from a memory associated with communication server 230. In another implementation, the IM application may automatically retrieve the information associated with the form-based first customer catalog from the memory.

Process 600 may include sending the form-based catalog information (block 645). For example, communication server 230 may present, using IM-based protocols, the form-based first customer catalog to user device 210 for display. The form-based first customer catalog may contain products and/or services that are available at a particular location corresponding to the valid zip code and/or may contain other information, such as advertising, special offers, incentives for the user to provide more information to receive additional offers, etc.

If an order has not been received and if the user has not ended the transaction (block 650—NO) (FIG. 6B), then an instruction to send another UI may be received (block 605) (FIG. 6A). Assume, for example, that the agent is communicating with the user of user device 210, via an IM or a series of IMs (e.g., via field 702 of FIGS. 7A and 7B). Assume further that the agent indicates that additional products and/or services, special offers, incentives, and/or more detail about products and/or services, associated with the first customer catalog, may be available to the user in exchange for additional information from the user. For example, the agent may instruct agent server 220 to send an instruction to communication server 230 to send a form-based user information UI to user device 210. The agent may provide the instruction by selecting name field 726, home address field 728, and/or telephone number field 730 on agent UI 720 of FIG. 7B. In another implementation, the IM application may automatically send the form-based user information UI to user device 210.

A form-based user information UI may be displayed and information may be received via the form-based user information UI. For example, in a manner similar to that described above (with respect to blocks 610-620 of FIG. 6A), communication server 230 may receive the instruction from agent server 240, may retrieve information associated with the form-based user information UI (e.g., form-based user information UI 800 of FIG. 8A), and/or may present the retrieved information, associated with the form-based user information UI, to user device 210 using IM-based protocols. For example, as illustrated in FIG. 8A, form-based user information UI 800 may include a portion of the fields (e.g., fields 702-706) included in form-based welcome UI 700 (FIG. 7A) and/or may include name field 802, home address field 804, telephone number (e.g., phone) field 806, shipping address field 808, and/or submit button field 810. While FIG. 8A illustrates form-based user information UI 800, that includes certain fields, such as fields 702-706 and fields 802-810, in another implementation, a form-based user information UI 800 may include fewer fields, additional fields, different fields or differently arranged fields than are described with respect to FIG. 8A.

Name field 802 may permit the user of user device 210 to enter a name (e.g., first, middle, last, and/or some other name format). Home address field 804 may permit the user to enter home address information, such as a street address, city, state, zip code, country (not shown), etc. Phone field 806 may permit the user to enter a home telephone number (e.g., 703-123-4567) and/or some other telephone number associated with the user. Shipping address field 808 may permit the user to indicate whether the shipping address is the same as the home address. For example, if the shipping address associated with the user is different than the home address entered in home address field 804, then the user may select the box associated with shipping address field 808 (e.g., by placing an "X," a "✓," or some other mark in the box) and the IM application may present additional fields (e.g., street, city, state, zip code, country, etc.), for display on user device 210 (not shown in FIG. 8A), that permit the user to enter shipping address information. If the shipping address and home address are the same, then the user may not select the box associated with shipping address field 808. Submit button field 810 may permit the user to submit user information, entered into form-based user information UI 800, to communication server 230 by selecting submit button 810 in a manner similar to that described above with respect to submit button field 710 (FIG. 7A).

Returning to FIG. 6B, a notification, associated with a form-based user information UI may be sent. For example, communication server 230 may send a notification, to agent server 220 for display via an agent UI (e.g., agent UI 720 of FIG. 8B), indicating that form-based user information UI 800 (FIG. 8A) was sent to user device 210. The notification may include all or a portion of the fields associated form-based user information UI 800 (e.g., fields 702-706 and/or fields 802-810 of FIG. 8A). For example, as illustrated in FIG. 8B, agent server 220 may receive the notification and may populate agent UI 720 with some or all of the data items obtained from the received notification that permits the agent to view the same or similar information that is displayed on user device 210.

The agent may, in response to the received notification, send an IM or series of IMs to user device 210, via text field 702 (FIG. 8B), instructing the user to enter user information into form-based user information UI 800. The user may enter user information (e.g., name, home address information, telephone number, shipping address information, etc.) into form-based user information UI 800 and may submit the user information to communication server 230, using IM-based protocols, by selecting the submit button field 810. Communication server 230 may receive the user information from user device 210 and via the form-based user information UI and may send a notification to agent server 220 that may cause name field 726, home address field 728, and/or telephone number field 730 to indicate (e.g., by changing physical appearance) that user information has been received from user device 210.

A verification operation may be performed. For example, communication server 230 may receive the user information and the IM application may perform a verification operation on the received user information in a manner similar to that described above (e.g., with respect to block 620 of FIG. 6A). For example, the IM application may send the received user information to provisioning server 240. Provisioning server 240 may receive the received user information and may compare the received user information with user information stored in a memory associated with provisioning server 240 to determine whether the received user information matches the stored user information. In another implementation, the IM application may perform the verification operation on the received user information.

If the received user information is determined to be invalid, then an invalid notification may be sent. For example, in a manner similar to that described above (e.g., with respect to blocks 625—NO and 630 of FIG. 6A) provisioning server 240 may send, to communication server 230, an indicator that the received user information is not valid based on the determination that the received user information does not match the stored user information. Communication server 230 may receive the invalidation indicator and may send an invalid notification to agent server 220 notifying the agent that the user information is not valid. Agent server 220 may receive the invalid notification and may cause verification status boxes 740, corresponding with name field 726, home address field 728, and/or telephone number field 730 of agent UI 720 (FIG. 8B), to store a particular mark (e.g., an "X") indicating that the name, the home address, and/or the telephone number, received from user device 210, are not valid. The agent may optionally send an IM to user device 210 instructing the user to reenter valid user information into the form-based user information UI displayed on user device 210.

If the received user information is determined to be valid, then a valid notification may be sent. For example, in a manner similar to that described above (e.g., with respect to blocks 625—YES and 635 of FIG. 6A), provisioning server 240 may send, to communication server 230, an indicator that the received user information is valid based on the determination that the received user information matches the stored user information. Communication server 230 may receive the validation indicator and may send a valid notification to agent server 220 notifying the agent that the received user information is valid. Agent server 220 may receive the valid notification and may cause verification status boxes 740, corresponding to name field 726, home address field 728, and/or telephone number field 730 of agent UI 720 (FIG. 8B), to store a particular mark (e.g., an "✓") indicating that the name, the home address, and/or the telephone number, received from user device 210, are valid. It should be understood that although the agent receives an indication that all or a portion of the user information has been determined to be valid, the agent does not have access to the actual user information submitted by the user. In another implementation, the agent may have access to the actual user information submitted by the user.

If a valid notification is received, then another form-based customer catalog may be sent. For example, in a manner similar to that described above (e.g., with respect to blocks 640 and 645 of FIG. 6A), the agent may receive the valid notification and may send an instruction to communication server 230 to send a particular form-based customer catalog UI (e.g., a form-based second customer catalog UI) to user device 210 by selecting customer catalog 2 field 744 (e.g., by pressing a particular button or series of buttons on user device 210). Communication server 230 may receive the instruction, the IM application may retrieve information associated with a form-based second customer catalog UI, and/or the IM application may present, using IM-based protocols, the form-based second customer catalog UI to user device 210 for display. The form-based second customer catalog UI (not shown) may contain details, terms, and/or conditions associated products and/or services that are available at the location corresponding to the address information provided by the user, potential installation dates and/or times, details associated with special offers, incentives, etc.

If an order has been received and the user has not ended the transaction (block 650—YES-ORDER), then order information may be received and a notification that an order has been received may be sent (block 655). For example, the user of user device 210 may view a particular form-based customer catalog UI (e.g., a form-based first customer catalog UI and/or a form-based second customer catalog UI), may place an order by selecting a particular product and/or service from a particular form-based customer catalog UI, and/or may submit the order to communication server 230 (e.g., by selecting a submit button on the form-based second customer catalog UI and/or by pressing a particular button, or a series of buttons, on user device 210). Communication server 230 may receive the order information from user device 210 (e.g., sent using IM-based protocols) and may send a notification to agent server 220 for display indicating that an order has been received.

Process 600 may include receiving an instruction to send a form-based payment UI and sending the form-based payment UI (block 660). For example, agent server 220 may receive the notification, and the agent, associated with agent server 220, may instruct communication server 230 to send a form-based payment UI to user device 210 (e.g., by selecting billing address field 732, credit check consent field 734, SSN field 736, and/or payment information field 738 associated with agent UI 720 (FIG. 8B). In a manner similar to that described above (e.g., with respect to blocks 605-620 of FIG. 6A), communication server 230 may send the form-based payment UI (e.g., form-based payment UI 900 of FIG. 9A) to user device 210 for display. In another implementation, communication server 230 may receive the order information from user device 210 and may automatically send the form-based payment UI to user device 210 for display.

Figures 9A, 9B:
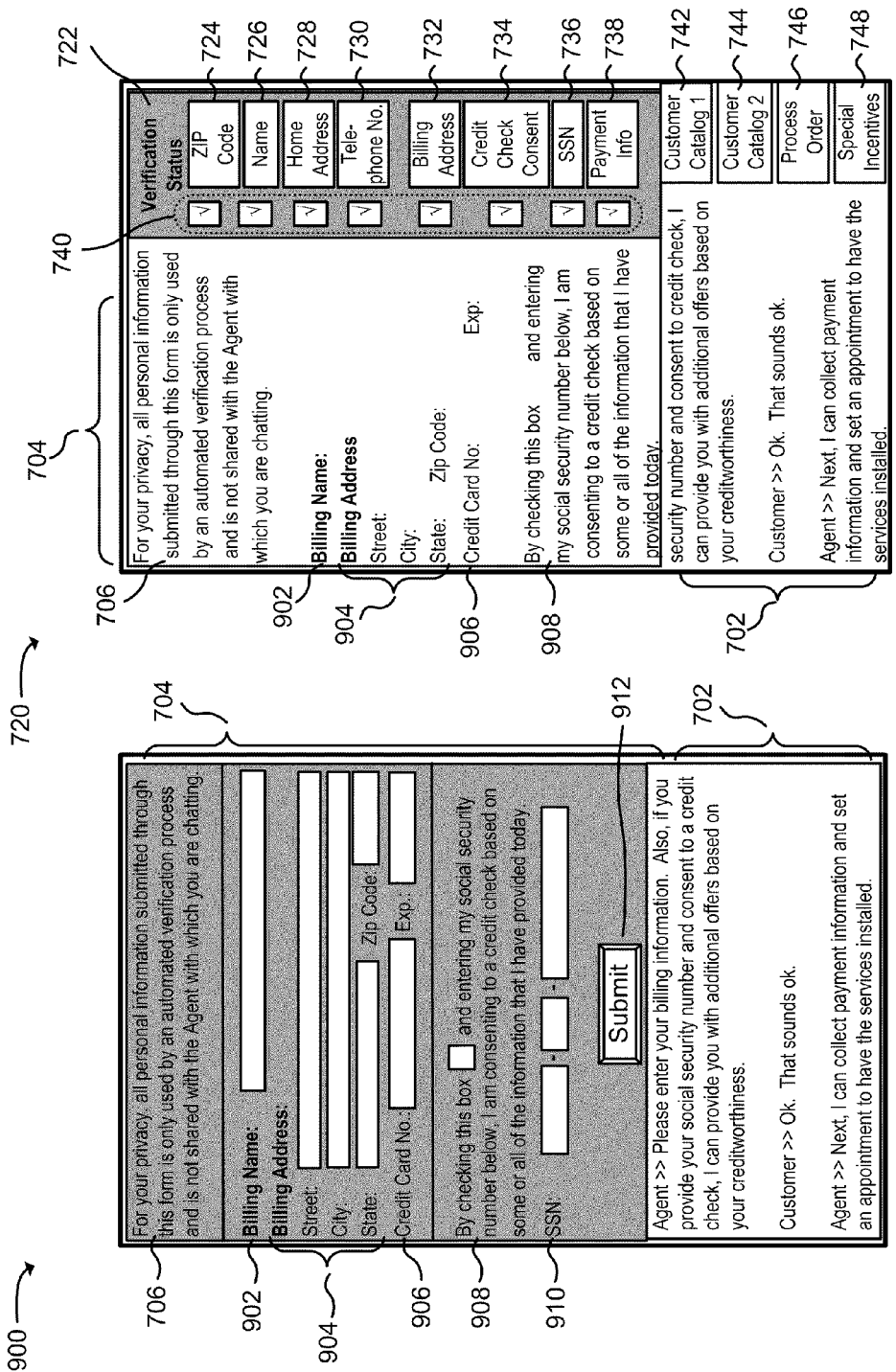

Form-based payment UI 900 (FIG. 9A) may include a portion of the fields (e.g., fields 702-706) included in form-based welcome UI 700 (FIG. 7A) and/or may include billing name field 902, billing address field 904, payment information field 906, credit check consent field 908, SSN field 910, and/or submit button field 912. While FIG. 9A illustrates form-based payment UI 900, that includes certain fields, such as fields 702-706 and/or fields 902-912, in another implementation, a form-based payment UI 900 may include fewer fields, additional fields, different fields or differently arranged fields than are described with respect to FIG. 9A.

Billing name field 902 may permit a user that is paying for the goods and/or services, identified in the ordering information received from user device 210, to enter a name. Billing address field 904 may permit billing address information, associated with billing name field 902, to be entered (e.g., street, city, state, zip code, country (not shown), etc.). Payment information field 906 may permit payment information (e.g., credit card type, credit card number, expiration date, and/or other payment information), associated with the user name entered in billing name field 902, to be entered. Credit check field 908 may include a field that permits the user, associated with billing name field 902, to consent to a credit check. SSN field 910 may permit a SSN, associated with the user name entered in billing name field 902, to be entered. For example, the user, associated with billing name field 902, may consent to a credit check by causing a particular mark to be entered in the box, associated with credit check field 906 (e.g., an "X," a "✓," or some other mark) and by entering a SSN in SSN field 908. Submit button field 912 may permit a user to submit billing information, entered into fields 902-910 and via form-based payment UI 900, to communication server 230.

Communication server 230 may send a notification to agent server 220 indicating that form-based payment UI 900 (FIG. 9A) was sent to user device 210. The notification may include all or a portion of the information associated with fields 902-910 (FIG. 9A). As illustrated in FIG. 9B, agent server 220 may receive the notification and may populate agent UI 720 (FIG. 9B) with some or all of the fields obtained from the received notification that permits the agent to view the same or similar information that is displayed by user device 210 via form-based payment UI 900 (FIG. 9A).

Process 600 may further include receiving billing information via the form-based payment UI and performing a verification operation on the received billing information (block 665). For example, as shown in FIG. 9B and in response to the received notification, the agent may send an IM to user device 210, via text field 702, instructing the user to enter billing information into form-based payment UI 900 (FIG. 9A). The user may enter billing information (e.g., billing name, billing address information, credit card information, SSN, credit check consent information, etc.) into form-based payment UI 900 and/or may submit the billing information to communication server 230, using IM-based protocols, by selecting submit button field 912.

Communication server 230 may receive the billing information and may send a notification to agent server 220 indicating that billing information was received (e.g., causing billing address field 732, credit check consent field 734, SSN field 736, and/or payment information field 738, of agent UI 720 (FIG. 9B), to change physical appearance). Additionally, or alternatively, communication server 230 may receive the billing information and the IM application may communicate with provisioning server 240 to perform a verification operation on the received billing information in a manner similar to that described above (e.g., with respect to block 620 of FIG. 6A). If the IM application determines that all or a portion of the billing information is not valid, then the received order for products and/or services may not be processed and/or process 600 may end. If, however, the IM application determines that the billing name, the billing address, SSN, and/or the payment information are valid, then communication server 230 may send a valid notification to agent server 220. Additionally, or alternatively, the IM application may determine that the user consented to a credit check (e.g., based on credit check information received from user device 210) and may communicate with provisioning server 240 and/or another server device to perform an operation to determine the creditworthiness (e.g., by obtaining a credit rating using the received SSN) of the user, associated with the billing name, received from user device 210.

Agent server 220 may receive the valid notification and may cause verification status boxes 740, corresponding to billing address field 732, SSN field 736, and/or payment information field 738 of agent UI 720 (FIG. 9B), to store a particular mark (e.g., an "✓") indicating that the billing name, the billing address, the SSN, and/or the credit card number, provided by the user, are valid. Additionally, or alternatively, the notification may include information associated with the creditworthiness of the user associated with billing name received from user device 210. It should be understood, however, that although the agent receives an indication that all or a portion of the billing information has been determined to be valid and/or receives information associated with the creditworthiness of the user, associated with the billing name, the agent may not have access to the actual billing information received from user device 210. In another implementation, the agent may have access to the actual user information submitted by the user.

Process 600 may include receiving an instruction to process an order and an order may be processed (block 670). For example, the agent associated with agent server 220 may receive the valid notification and may send an instruction, to process the received order, to communication server 230. The instruction may be sent when the agent selects a particular field (e.g., process order field 746) on agent UI 720 (FIG. 9B). Communication server 230 may receive the instruction and/or may send the received billing information and/or the received order information to provisioning server 240 to be processed. Provisioning server 240 may process the order by establishing shipping dates, installation dates, processing payment information to receive payment, obtaining goods from inventory, etc. and/or by generating confirmation information associated with the order. Provisioning server 240 may send confirmation information to communication server 230. In another implementation, communication server 230 may automatically process the received order based on the determination, described above, that the received billing information is valid.

Process 600 may include receiving confirmation information and sending a form-based confirmation information UI (block 675). For example, communication server 230 may receive the confirmation information and may retrieve information, associated with a form-based confirmation UI, from a memory associated with communication server 230. Communication server 230 may send, using IM-based protocols, the confirmation information, and/or the retrieved information associated with the form-based confirmation UI to user device 210 for display. Additionally, or alternatively, communication server 230 may send a confirmation notification to agent server 220 to notify the agent that the order has been processed.

The agent may receive the confirmation notification and may send an instruction to communication server 230 to send a form-based special incentives UI to user device 210 based on the creditworthiness of the user. Information associated with the form-based special incentives UI may include reduced prices and/or rebates for products and/or services if the credit rating associated with the user is greater than a particular threshold. In another example, the form-based special incentives UI may include different and/or more flexible payment plans, additional payment options, and/or more favorable terms and/or conditions when the credit rating, associated with the user, is greater than the particular threshold.

If an order has not been received and the user has ended the transaction (block 650—YES-END), then process 600 may end. For example, communication server 230 may not receive an order from user device 210. Additionally, or alternatively, communication server 230 may receive, from user device 210, an instruction to end the transaction. Communication server 230 may store, in a memory associated with communication server 230, information received from user device 210 (e.g., zip code information, user information, billing information, free form text information, and/or other information associated with the transaction) and process 600 may end.

Implementations described herein may provide for secure IM-based sales concurrently using a combination of IM-based protocols, such as free form text messages, form-based messages, and/or form-based user interface (UIs). For example, a server device may conduct an electronic sales transaction with a user device using IM-based protocols, where the electronic sales transaction includes both form-based IM communications and text-based IM communications. The form-based IM communications may permit a form-based UI to be displayed, on the user device, via which information regarding a user, of the user device, is received. The text-based IM communications may permit text-based IMs between an agent associated with the server device and the user of the user device to be displayed on the user device. The server device may further receive, via the form-based UI, a form-based IM that includes an order for one or more products or services associated with the electronic sales transaction.

The foregoing description provides illustration and description, but is not intended to be exhaustive or to limit the invention to the precise form disclosed. Modifications and variations are possible in light of the above teachings or may be acquired from practice of the invention.

While a series of blocks has been described with regard to FIGS. 6A and 6B, the order of the blocks may be modified in other implementations. Further, non-dependent blocks may be performed in parallel.

It will be apparent that systems and methods, as described above, may be implemented in many different forms of software, firmware, and hardware in the implementations illustrated in the figures. The actual software code or specialized control hardware used to implement these systems and methods is not limiting of the invention. Thus, the operation and behavior of the systems and methods were described without reference to the specific software code—it being understood that software and control hardware can be designed to implement the systems and methods based on the description herein.

Further, certain portions, described above, may be implemented as a component that performs one or more functions. A component, as used herein, may include hardware, such as a processor, an ASIC, or a FPGA, or a combination of hardware and software (e.g., a processor executing software).

It should be emphasized that the terms "comprises"/"comprising" when used in this specification are taken to specify the presence of stated features, integers, steps or components but does not preclude the presence or addition of one or more other features, integers, steps, components or groups thereof.

Even though particular combinations of features are recited in the claims and/or disclosed in the specification, these combinations are not intended to limit the disclosure of the invention. In fact, many of these features may be combined in ways not specifically recited in the claims and/or disclosed in the specification. Although each dependent claim listed below may directly depend on only one other claim, the disclosure of the invention includes each dependent claim in combination with every other claim in the claim set.

No element, act, or instruction used in the present application should be construed as critical or essential to the invention unless explicitly described as such. Also, as used herein, the article "a" is intended to include one or more items. Where only one item is intended, the term "one" or similar language is used. Further, the phrase "based on" is intended to mean "based, at least in part, on" unless explicitly stated otherwise.

What is claimed is:

1. A method performed by a server device, the method comprising:
   conducting, by the server device, an electronic sales transaction associated with a user device using instant message (IM)-based protocols to communicate with an agent associated with the server device, the electronic sales transaction including:
   receiving, via form-based IM communications responsive to a first form-based user information user interface (UI) presented to the user device, first user information regarding a user, of the user device, wherein at least a portion of the first user information is not accessible by the agent;
   presenting, based on a verification of the first user information, a first form-based catalog UI related to a customized set of products or services corresponding to the first user information;
   determining, in response to text-based IM communications between the agent and the user, that the user has neither placed an order for any of the customized set of one or more products or services nor terminated the electronic sales transaction;
   receiving, via form-based IM communications responsive to a second form-based user information UI presented to the user device, second user information regarding the user;
   presenting, based on a verification of the second user information, a second form-based catalog UI related to different information, associated with the customized set of products or services, corresponding to the second user information; and
   receiving, by the server device and via the second form-based catalog UI, a form-based IM that includes an order for one or more of the customized set of products or services associated with the different information.

2. The method of claim 1, wherein conducting the electronic sales transaction further includes:
   comparing the first user information regarding the user of the user device, with other information, regarding the user of the user device, stored in a memory; and
   determining that the first user information regarding the user is valid when the received information regarding the user matches the other information regarding the user.

3. The method of claim 1, further comprising:
   presenting, when the verification of the first user information cannot be performed, a third form-based catalog UI, to be displayed on the user device, related to a non-customized set of products or services is received.

4. The method of claim 1, where conducting the electronic sales transaction further includes:
   presenting, on a display associated with the server device, information associated with an agent UI, the agent UI permitting the agent, associated with the server device, to enter text associated with the electronic sales transaction; and
   sending, to the user device and via the agent UI, a text-based IM, for display via the form-based UI, instructing the user to enter the order for the one or more products or services.

5. The method of claim 1, wherein receiving the form-based IM, via the second form-based catalog UI, further includes:
   retrieving, from a memory, information associated with a form-based payment UI; and
   presenting the retrieved information, associated with the form-based payment UI, using a particular form-based IM communication that permits the form-based payment UI to be displayed, on the user device, via which billing information, associated with the order for the one or more of the customized set of products or services, is received.

6. The method of claim 5, where presenting the retrieved information associated with the form-based payment UI includes:
   sending, to the user device and for display, via the form-based payment UI, a text-based IM instructing the user to enter the billing information into the form-based payment UI.

7. The method of claim 5, further comprising:
   receiving, from the user device and via the form-based payment UI, another form-based IM, the other form-based IM including the billing information associated with the order for the one or more of the customized set of products or services.

8. The method of claim 7, wherein at least a portion of the billing information, associated with the order for the one or more of the customized set of products or services, is not accessible by the agent associated with the server device.

9. A server device comprising:
   a processor configured to:
      conduct an electronic sales transaction with a user device using instant message (IM)-based protocols, the electronic sales transaction including:
         form-based IM communications that permit one or more form-based user interfaces (UIs) to be displayed, on the user device, via which particular information associated with the electronic sales transaction is received in a manner that is not accessible by an agent associated with the server device, and
         text-based IM communications that permit text-based IMs, between the agent and a user of the user device, to be displayed on the user device,
      receive, via one of the form-based UIs, a form-based IM that includes an order for a product or a service,
      send, to the user device and for display via another one of the form-based UIs, a text-based IM instructing the user to enter billing information, associated with the received order, into the other one of the form-based UIs,
      receive, via the other one of the form-based UIs, another form-based IM that includes the billing information associated with the order for the product or the service,
      send the received billing information to a provisioning server to use the billing information to determine a measure of creditworthiness of the user,
      receive, from the provisioning server, a first notification indicative of the measure of creditworthiness of the user,
      present a form-based catalog UI to the user device for display, using a particular form-based IM communication, that includes a first number of special offers or incentives related to the order for the product or the service when the measure of creditworthiness does not exceed a particular threshold, and
      present another form-based catalog UI to the user device for display, using another particular form-based IM communication, that includes a second number of special offers or incentives related to the order for the product or the service when the measure of creditworthiness exceeds the particular threshold, wherein the second number is greater than the first number.

10. The server device of claim 9, where the billing information, received via the form-based UI, is not accessible by the agent associated with the server device.

11. The server device of claim 9, wherein, when receiving the other form-based IM, the processor is further configured to:
   receive, from the provisioning server, a second notification indicating that the received billing information has been authenticated.

12. The server device of claim 9, wherein the measure of creditworthiness is not accessible by the agent associated with the server device.

13. The server device of claim 9, where, when conducting the electronic sales transaction, the processor is further to:
   present, on a display associated with the server device, information associated with an agent UI, the agent UI permitting the agent to enter text associated with the electronic sales transaction,
   receive, via the agent UI, an instruction for the user to enter the order for the product or the service, and
   send, to the user device, a text-based IM that includes the instruction for the user to enter the order for the product or service.

14. A system comprising:
   a server device configured to:
      conduct an electronic sales transaction with a user device using instant message (IM)-based protocols, the electronic sales transaction including:
         form-based IM communications that permit a form-based user interface (UI) to be displayed, on the user device, via which information, regarding a user of the user device, is received in a confidential manner with respect to an agent associated with the server device, and
         text-based IM communications that permit text-based IMs between the agent and the user of the user device to be displayed on the user device,
      receive, via the form-based UI, a form-based IM that includes the information regarding the user,
      retrieve information, associated with a first form-based catalog UI that includes a first customized set of products or services based on a first amount of address information identified in the information regarding the user,
      retrieve information, associated with a second form-based catalog UI that includes a second customized set of products or services based on a second amount of address information identified in the information regarding the user, wherein the second amount is greater than the first amount,
      present the retrieved information, associated with at least one of the first form-based catalog UI or the second form-based catalog UI, using a particular form-based IM communication, for display on the user device,
      send, to the user device and for display via the at least one of the first form-based catalog UI or the second form-based catalog UI, a text-based IM instructing the user to enter an order, for one or more of the first or second customized set of products or services,
      receive, via the at least one of the first form-based catalog UI or the second form-based catalog UI, another form-based IM that includes the order for the one or more of the first or second customized set of products or services associated.

15. The system of claim 14, where the information, regarding the user, is handled in the confidential manner in which the agent is not permitted to view the information regarding the user.

16. The system of claim 14, where the server device is further to perform an operation to determine whether the information, regarding the user, can be authenticated by:

sending the information, regarding the user, to a provisioning server to determine whether the information, regarding the user, can be authenticated, and receiving, from the provisioning server, a notification that the information regarding the user has been authenticated.

17. The system of claim 14, wherein the server device is further configured to:

retrieve, from a memory, information associated with a form-based payment UI, and present the retrieved information, associated with the form-based payment UI, using a particular form-based IM communication that permits the form-based payment UI to be displayed, on the user device, via which billing information, associated with the order for the one or more of the customized set of products or services, is received.

18. The system of claim 17, where, when presenting the retrieved information associated with the form-based payment UI, the server device is further to:

send, to the user device and for display, via the form-based payment UI, a text-based IM instructing the user to enter the billing information into the form-based payment UI.

19. The system of claim 18, wherein the server device is further configured to:

receive, from the user device and via the form-based payment UI, a further form-based IM that includes the billing information associated with the order for the one or more of the customized set of products or services, and process the received billing information in the confidential manner that does not permit the agent to access the received billing information.

* * * * *